(12) United States Patent
Ikawa et al.

(10) Patent No.: US 10,393,212 B2
(45) Date of Patent: Aug. 27, 2019

(54) ANTIVIBRATION DEVICE (71) Applicant: TOYO TIRE & RUBBER CO., LTD., Itami-shi, Hyogo (JP)

(72) Inventors: Tatsuki Ikawa, Itami (JP); Yoshiyuki Seno, Itami (JP); Hideo Igata, Itami (JP)

(73) Assignee: TOYO TIRE CORPORATION, Itami-shi (JP)

( * ) Notice: Subject to any disclaimer, the term of this patent is extended or adjusted under 35 U.S.C. 154(b) by 0 days.

(21) Appl. No.: 15/846,654

(22) Filed: Dec. 19, 2017

(65) Prior Publication Data
US 2018/0172107 A1 Jun. 21, 2018

(30) Foreign Application Priority Data

Dec. 21, 2016 (JP) ................. 2016-247388

(51) Int. Cl.
*F16F 13/08* (2006.01)
*F16F 13/10* (2006.01)
*B60K 5/12* (2006.01)
*F16F 1/36* (2006.01)
*F16F 1/387* (2006.01)

(52) U.S. Cl.
CPC .......... *F16F 13/108* (2013.01); *B60K 5/1208* (2013.01); *F16F 1/36* (2013.01); *F16F 1/387* (2013.01); *F16F 13/085* (2013.01); *F16F 13/10* (2013.01); *F16F 2224/0208* (2013.01)

(58) Field of Classification Search
CPC ......... F16F 13/08; F16F 13/108; F16F 13/085
USPC ........................................ 267/140.5, 140.13
See application file for complete search history.

(56) References Cited

U.S. PATENT DOCUMENTS

| 5,895,032 A * | 4/1999 | Simuttis ............ F16F 13/108 267/140.12 |
| 8,517,359 B2 * | 8/2013 | Graeve .............. F16F 13/262 267/140.13 |
| 2002/0117788 A1 | 8/2002 | West |
| 2002/0195758 A1 | 12/2002 | Yamamoto et al. |
| 2003/0030202 A1 | 2/2003 | Thomazeau et al. |
| 2003/0038414 A1 | 2/2003 | Pizanti et al. |

(Continued)

FOREIGN PATENT DOCUMENTS

| EP | 1217251 A2 | 6/2002 |
| JP | 2016-50658 A | 4/2016 |
| WO | 2008/111610 A1 | 9/2008 |

OTHER PUBLICATIONS

U.S. Appl. No. 15/846,670, filed Dec. 19, 2017.

(Continued)

*Primary Examiner* — Nicholas J Lane
(74) *Attorney, Agent, or Firm* — Westerman, Hattori, Daniels & Adrian, LLP (57) ABSTRACT A junction with an antivibration base body joined to its outer periphery is equipped with a chamfer portion where a corner connecting a flange portion with the junction is removed, a base portion connected to the chamfer portion in the axial direction, and an end portion connected to the base portion in the axial direction. At the junction, a first projection plane made by projecting at least the end portion in a first direction orthogonal to the axis is set to be smaller in area than a second projection plane made by projecting at least the end portion in a second direction orthogonal to the axis and the first direction.

4 Claims, 3 Drawing Sheets (56) References Cited

U.S. PATENT DOCUMENTS

| | | | | |
|---|---|---|---|---|
| 2003/0067104 | A1* | 4/2003 | Takashima | F16F 13/101 |
| | | | | 267/140.13 |
| 2006/0043657 | A1 | 3/2006 | Tanaka | |
| 2006/0097436 | A1 | 5/2006 | Yamamoto | |
| 2009/0302515 | A1 | 12/2009 | Graeve et al. | |
| 2010/0096787 | A1 | 4/2010 | Kojima | |
| 2010/0102495 | A1* | 4/2010 | Okumura | F16F 13/108 |
| | | | | 267/140.13 |
| 2012/0306134 | A1* | 12/2012 | Tanaka | F16F 13/18 |
| | | | | 267/140.13 |
| 2016/0186830 | A1 | 6/2016 | Furusawa et al. | |

OTHER PUBLICATIONS

Extended European Search Report dated May 22, 2018, issued in counterpart European Application No. 17206127.7. (8 pages).

Extended European Search Report dated Jun. 1, 2018, issued in European Application No. 17206133.5 (counterpart to U.S. Appl. No. 15/846,670). (8 pages).

Non-Final Office Action dated Feb. 5, 2019, issued in U.S. Appl. No. 15/846,670 (18 pages).

Final Office Action dated Jun. 3, 2019, issued in U.S. Appl. No. 15/846,670 (14 pages).

Office Action dated May 22, 2019, issued in counterpart CN Application No. 201711104028.X, with English translation (10 pages).

Office Action dated May 28, 3019, issued in counterpart CN Application No. 201711104426.1, with English translation (10 pages).

\* cited by examiner

ANTIVIBRATION DEVICE

TECHNICAL FIELD

The present invention relates to an antivibration device and particularly to, an antivibration device with spring constants differing in two directions orthogonal to its axis.

BACKGROUND ART

As antivibration devices supporting a vibration source like an engine or the like on a vehicle body, there is known an antivibration device disclosed in Patent Literature 1, for example. In the antivibration device disclosed in Patent Literature 1, a shaft-like first fixture and a sleeve-like second fixture are connected by an antivibration base body including a rubber elastic body. At a portion joined to the antivibration base body of the first fixture, a first projection plane made by being projected in a first direction orthogonal to the axis is smaller in area than a second projection plane made by being projected in a second direction orthogonal to the axis and the first direction. Thus, it is possible to make a spring constant in the first direction smaller than that in the second direction.

CITATION LIST

Patent Literature

[Patent Literature 1] JP-A No. 2016-50658

SUMMARY OF INVENTION

Technical Problem

However, in the aforementioned related art, there is a requirement for improvement in the durability of the antivibration base body.

The present invention has been made in order to meet the aforementioned requirement, and an object of the present invention is to provide an antivibration device capable of improving the durability of an antivibration base body with spring constants made to differ in two directions orthogonal to its axis.

Solution to Problem

In order to accomplish this object, an antivibration device of the present invention is equipped with a shaft-like first fixture extending along an axis, a sleeve-like second fixture having on at least one side an opening being larger than the external shape of the first fixture, and an antivibration base body including a rubber elastic body and joined at least to the first fixture and the opening of the second fixture. The first fixture is equipped with a junction having the antivibration base body joined to the outer periphery and a flange portion connected to the junction and having the antivibration base body joined. The junction is equipped with a chamfer portion where a corner connecting the flange portion and the junction is removed, a base portion connected to the chamfer portion in the axial direction, and an end portion connected to the base portion in the axial direction. At the junction, a first projection plane made by projecting at least the end portion in a first direction orthogonal to the axis is set to be smaller in area than a second projection plane made by projecting at least the end portion in a second direction orthogonal to the axis and the first direction.

Advantageous Effect of Invention

According to the antivibration device in a first aspect, the junction with the antivibration base body joined thereto is such that the first projection plane made by projecting at least the end portion in the first direction orthogonal to the axis is smaller in area than the second projection plane made by projecting at least the end portion in the second direction orthogonal to the axis and the first direction, and thus, it is possible to make a spring constant in the first direction smaller than that in the second direction. Since the chamfer portion and the base portion exist between the end portion and the flange portion, distortion of the antivibration base body can be mitigated. Accordingly, it is possible to improve the durability of the antivibration base body with the spring constants made to differ in two directions orthogonal to the axis.

According to the antivibration device in a second aspect, since at the base portion, the area of the first projection plane and the area of the second projection plane are substantially the same in size, the distortion produced in the antivibration base body at the periphery of the base portion can be made to be small. Accordingly, in addition to the advantageous effect of the first aspect, it is possible to further improve the durability of the antivibration base body.

According to the antivibration device in a third aspect, the first fixture is equipped with a stopper portion including a rubber elastic body and covering a surface of the flange portion opposite to the junction. Since a restriction member secured to the second fixture faces the stopper portion in the axial direction and restrains the relative displacement of the first fixture, it is possible to limit a tensile load exerted on the antivibration base body in the axial direction. As a result, in addition to the advantageous effect of the first aspect, it is possible to further improve the durability of the antivibration base body.

According to the antivibration device in a fourth aspect, at the flange portion, protrusions protruding in the axial direction are provided intermittently in the circumferential direction on the surface where the stopper portion is provided. The stopper portion is equipped with first portions covering flat portions between the protrusions with the rubber elastic body and second portions covering the protrusions with the rubber elastic body. Since the thickness in the axial direction of the rubber elastic body at the second portions is thinner than the thickness in the axial direction of the rubber elastic body at the first portions, springs of the first portions can be made to be softer than springs of the second portions. Accordingly, in addition to the advantageous effect of the third aspect, a vibration isolation effect owing to the first portions can be obtained when the first portion of the stopper portion abuts on the restriction member.

According to the antivibration device in a fifth aspect, the first portions are disposed in the first direction or the second direction. Accordingly, in addition to the advantageous effect of the fourth aspect, the vibration isolation effect owing to the first portion can be obtained when the relative displacement between the first fixture and the second fixture in the first direction or the second direction brings the first portion of the stopper portion into abutment on the restriction member.

According to the antivibration device in a sixth aspect, the antivibration base body is equipped with a connection portion surrounding a portion which, of the first fixture, extends from the base portion through the chamfer portion to the flange portion, and a wall portion connected to the connection portion and closing the opening of the second fixture. In a section including the axis, an outer peripheral surface of the junction is inclined, at a radially inside position of a boundary between the wall portion and the connection portion, relative to the axis to come close to the axis with distance from the flange portion. As a result, the thickness of the rubber elastic body surrounding the junction can be made to become thicker gradually from the connection portion toward the wall portion in the axial direction. Since the distortion produced at the boundary between the connection portion and the wall portion can be made to be small, it is possible to further improve the durability of the antivibration base body in addition to the advantageous effect of the first aspect.

DESCRIPTION OF EMBODIMENTS

Figure 1:
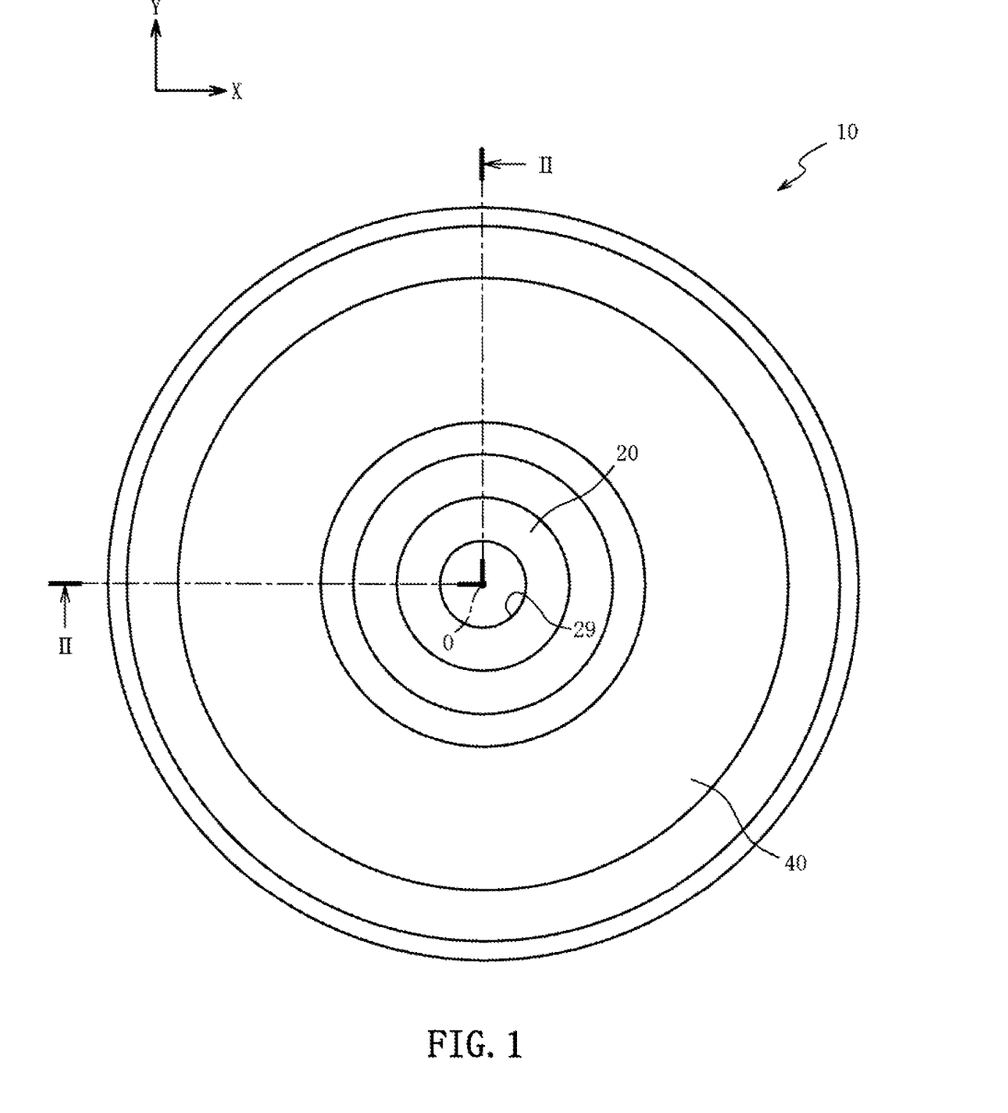
FIG. 1 is a plan view of an antivibration device in a first embodiment according to the present invention.
Figure 2:
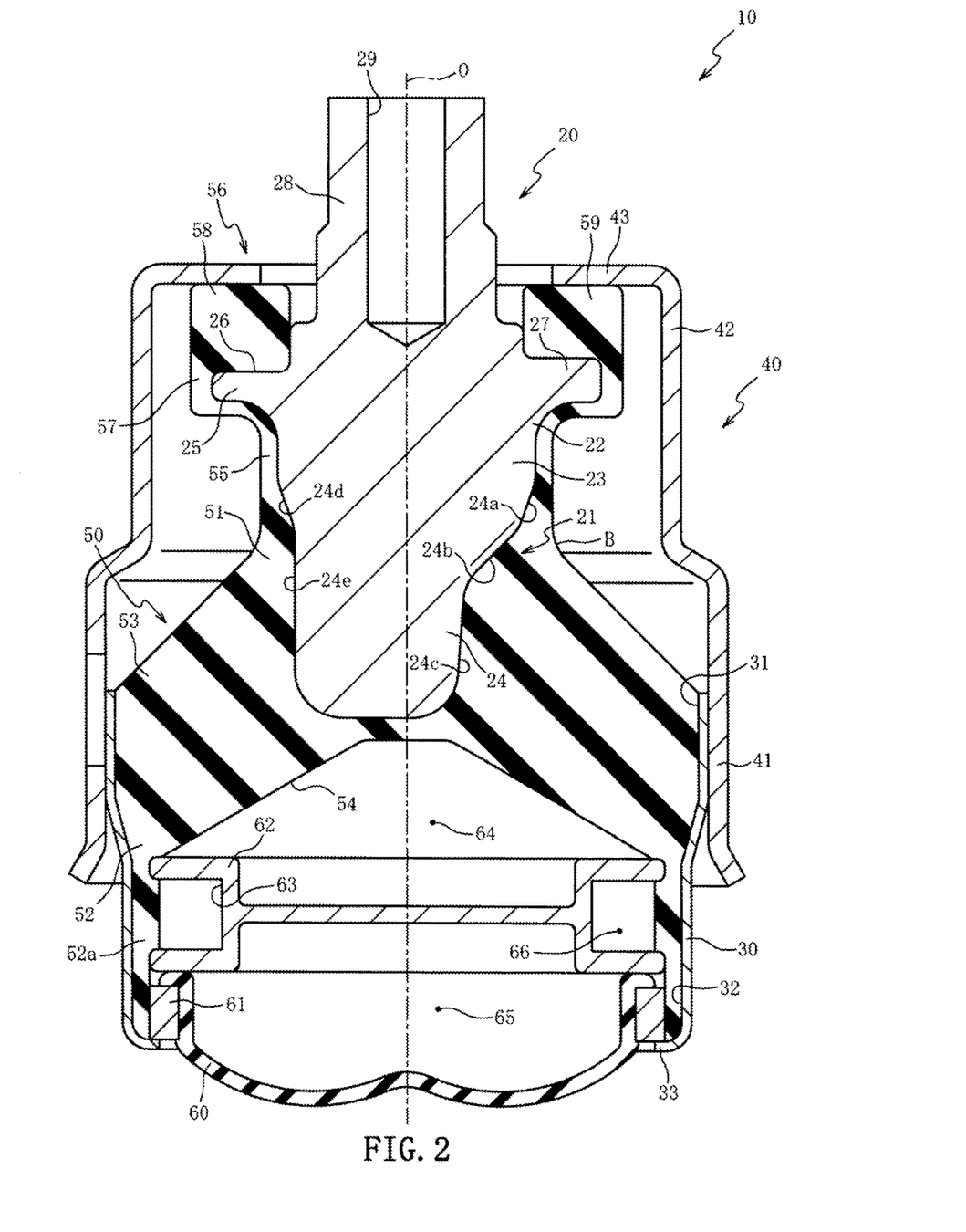
FIG. 2 is a sectional view of the antivibration device taken along the II-II line in FIG. 1.

Hereinafter, preferred embodiments of the present invention will be described with reference to the accompanying drawings. FIG. 1 is a plan view of an antivibration device 10 in a first embodiment according to the present invention, and FIG. 2 is a sectional view of the antivibration device 10 taken along the II-II line in FIG. 1. An arrow X and an arrow Y shown in FIG. 1 respectively represent a right-left direction (first direction) and a front-rear direction (second direction) of a motor vehicle mounting the antivibration device 10. The direction of an axis O (the direction normal to the drawing sheet of FIG. 1) represents a vertical direction of the motor vehicle and is a direction in which primary vibration is inputted to the antivibration device 10. Incidentally, FIG. 2 shows the antivibration device 10 in a no-load state.

As shown in FIG. 2, the antivibration device 10 is an engine mount for elastically supporting an engine of the motor vehicle and is equipped with a first fixture 20 attached to the engine (not shown) side being a vibration source, a second fixture 30 attached to a vehicle body (not shown) on a supporting side, and an antivibration base body 50 including a rubber elastic body and interposed between the first fixture 20 and the second fixture 30 to join the first fixture 20 and the second fixture 30.

The first fixture 20 is a shaft-like casting integrally made of an iron-base material, an aluminum alloy or the like and extending along the axis O. The first fixture 20 is equipped with a junction 21 with the antivibration base body 50 joined at its outer periphery, a flange portion 25 connected to the junction 21, and a shaft portion 28 connected to the flange portion 25. The shaft portion 28 is formed at its center with a bolt hole 29 extending along the axis O. The first fixture 20 is attached to a mating member like the engine or the like through a bolt (not shown) screwed in the bolt hole 29.

The junction 21 is equipped with a chamfer portion 22, a base portion 23 and an end portion 24. The chamfer portion 22 is a region where a corner connecting the flange portion 25 to the junction 21 is removed to be made as a circular shape or a slant surface. In the present embodiment, the chamfer portion 22 is a circle adjoining to the flange portion 25 and the base portion 23.

The base portion 23 is a region connected to the chamfer portion 22 in the axis O direction (on the opposite side to the flange portion 25). The base portion 23 takes a round column shape in the present embodiment. At the base portion 23, a first projection plane made by projecting the base portion 23 in the first direction (the arrow X direction in FIG. 1) orthogonal to the axis O is set to be substantially the same in area as a second projection plane made by projecting the base portion 23 in the second direction (the arrow Y direction in FIG. 1) orthogonal to the axis O and the first direction.

In FIG. 2, the first projection plane is a plane formed by combining a right side portion of the axis O as a boundary with a portion formed by turning the right side portion around the axis O as a symmetry axis. The second projection plane is a plane formed by combining a left side portion of the axis O as the boundary with a portion formed by turning the left side portion around the axis O as the symmetry axis. That is, of the junction 21, the base portion 23 is a portion where the right and left areas with the axis O put therebetween in FIG. 2 become substantially the same.

Incidentally, being substantially the same in area between the two projection planes of the base portion 23 does mean to also encompass slightly differing in area between the two projection planes besides being completely the same in size between the two projection planes. The degree of slightly differing in area between the two projection planes means the degree which does not become an obstruction in restraining (referred to later) the distortion at a portion which, of the antivibration base body 50, is joined to the periphery of the base portion 23.

The end portion 24 is a region connected to the base portion 23 in the axis O direction (on the opposite side to the flange portion 25). The end portion 24 takes a flat frustoconical shape wherein a first projection plane made by projecting the end portion 24 in the first direction (the arrow X direction in FIG. 1) is smaller in area than a second projection plane made by projecting the end portion 24 in the second direction (the arrow Y direction in FIG. 1). That is, the end portion 24 is a portion which is of the junction 21 and at which the area on the left side of the axis O in FIG. 2 is larger than the area on the right side.

In the present embodiment, the end portion 24 has outer peripheral surfaces 24a, 24b, 24c appearing on the first projection plane and has outer peripheral surfaces 24d, 24e appearing on the second projection plane. The outer peripheral surfaces 24a, 24b, 24c are connected along the axis O toward a direction going away from the flange portion 25, and so are the outer peripheral surfaces 24d, 24e. In the section including the axis O, the outer peripheral surfaces 24a, 24b, 24c are inclined to make the distance from the axis O become smaller gradually with distance from the flange portion 25. In the section including the axis O, the angle which the outer peripheral surface 24a makes with the axis O is smaller than the angle which the outer peripheral surface 24b makes with the axis O, and the angle which the outer peripheral surface 24a makes with the axis O is larger than the angle which the outer peripheral surface 24c makes with the axis O.

In the section including the axis O, the outer peripheral surface 24d is inclined to make the distance from the axis O become smaller gradually with distance from the flange portion 25. In the section including the axis O, the outer peripheral surface 24e is almost parallel to the axis O. In the section including the axis O, the angle which the outer peripheral surface 24d makes with the axis O is smaller than the angle which the outer peripheral surface 24a makes with the axis O. The length in the axis O direction of the outer peripheral surface 24d is almost the same as the length in the axis O direction of the outer peripheral surface 24a. The length in the axis O direction of the outer peripheral surface 24e is almost the same as the length in the axis O direction of the sum of the outer peripheral surface 24b and the outer peripheral surface 24c. Thus, the junction 21 takes a column shape on a root side close to the flange portion 25 and takes a flat pillar shape on the end side remote from the flange portion 25.

Further, the mean value of outer diameters at a center position in the axis O direction of the end portion 24 is set to be smaller than the mean value of outer diameters at a center position in the axis O direction of the base portion 23. Incidentally, the mean value of the outer diameters at the center position in the axis O direction of the base portion 23 means the diameter of a circle having the same area as the area of a section that is obtained by cutting the base portion 23 in a direction orthogonal to the axis O at a center position in the axis O direction of the base portion 23. The mean value of the outer diameter at the center position in the axis O direction of the end portion 24 means the diameter of a circle having the same area as the area of a section that is obtained by cutting the end portion 24 in a direction orthogonal to the axis O at a center position in the axis O direction of the end portion 24.

The flange portion 25 takes the shape of a disc whose outer diameter is larger than the outer diameter of the base portion 23. The flange portion 25 is formed with protrusions 27 protruding in the axis O direction at a surface opposite to the surface to which the chamfer portion 22 is connected. Since the protrusions 27 are provided intermittently in the circumferential direction of the flange portion 25, flat portions 26 being lower than the height in the axis O direction of the protrusions 27 are formed between the protrusions 27. In the present embodiment, the flat portions 26 are formed in the first direction (the arrow X direction in FIG. 1), while the protrusions 27 are formed in the second direction (the arrow Y direction in FIG. 1).

The second fixture 30 is a sleeve-like member of a high rigidity having an inner diameter larger than the outer diameter of the junction 21 and is formed with openings 31, 32 at opposite ends in the axis O direction. With the junction 21 directed toward the opening 31, the first fixture 20 is disposed to be spaced from the second fixture 30 on the same axis O. The second fixture 30 has a restriction member 40 secured thereto.

The restriction member 40 is a high rigidity member for restraining the relative displacement between the first fixture 20 and the second fixture 30 through an abutment at a stopper portion 56 (referred to later). The restriction member 40 is equipped with a sleeve-like retainer portion 41 into which the second fixture 30 is inserted, a sleeve-like first restriction portion 42 extending from the retainer portion 41 in the axis O direction, and an annular second restriction portion 43 protruding radially inward from an end portion in the axis O direction of the first restriction portion 42.

The antivibration base body 50 is a member constituted by a rubber elastic body and is equipped with a small-diameter side end portion 51 on one end side in the axis O direction, a large-diameter side end portion 52 on the other end side, and a wall portion 53 connecting the small-diameter side end portion 51 and the large-diameter side end portion 52. The small-diameter side end portion 51 is a region to which the junction 21 of the first fixture 20 is joined through vulcanization at its outer periphery. Since the junction 21 is joined to the small-diameter side end portion 51, the junction 21 is embedded in the antivibration base body 50. The large-diameter side end portion 52 is a region whose outer diameter is formed to be larger than that of the small-diameter side end portion 51. The large-diameter side end portion 52 is joined through vulcanization at its outer peripheral surface to an inner peripheral surface on the opening 31 side of the second fixture 30.

Since the first fixture 20 and the second fixture 30 are joined through vulcanization to the antivibration base body 50, the wall portion 53 closing the opening 31 of the second fixture 30 is interposed between the first fixture 20 and the second fixture 30. The wall portion 53 takes a frustoconical shape. The antivibration base body 50 is formed with a concave portion 54 at an end surface in the axis O direction of the large-diameter side end portion 52. The concave portion 54 expands in inner diameter with distance from the first fixture 20 in the axis O direction. The antivibration base body 50 is formed with a sleeve-like sealing layer 52a which extends in the axis O direction from the whole circumference at an outer peripheral rim of the large-diameter side end portion 52. The sealing layer 52a is joined through vulcanization to the inner peripheral surface of the second fixture 30.

The antivibration base body 50 has a connection portion 55 connected to the small-diameter side end portion 51. The connection portion 55 surrounds a portion which, of the first fixture 20, extends from the outer peripheral surfaces 24a, 24d of the end portion 24 to the flange portion 25 through the base portion 23 and the chamfer portion 22. Of the connection portion 55, a portion connected to the outer peripheral surfaces 24a, 24d of the end portion 24 and the base portion 23 has an outer diameter identical throughout the entire length in the axis O direction. The connection portion 55 is a region that connects the small-diameter side end portion 51 and the stopper portion 56. In the antivibration base body 50, the outer diameter of a portion (a part of the wall portion 53) surrounding the outer peripheral surfaces 24b, 24c, 24e of the end portion 24 is set to be larger than the outer diameter of a portion (a part of the connection portion 55) surrounding the outer peripheral surfaces 24a, 24d of the end portion 24.

The stopper portion 56 is a rubber elastic body covering the flange portion 25. The stopper portion 56 restrains the relative displacement of the first fixture 20 to the second fixture 30 in abutment on the restriction member 40. The stopper portion 56 is equipped with a side portion 57 covering the outer peripheral surface of the flange portion 25, first portions 58 covering the flat portions 26 of the flange portion 25, and second portions 59 covering the protrusions 27 of the flange portion 25. The side portion 57 faces the first restriction portion 42 of the restriction member 40. When the side portion 57 abuts on the first restriction portion 42, the relative displacement is restrained between the first fixture 20 and the second fixture 30 in a direction orthogonal to the axis O. The first portions 58 and the second portions 59 face the second restriction portion 43 of the restriction member 40. When the first portions 58 and the second portions 59 abut on the second restriction portion 43, the relative displacement is restrained between the first fixture 20 and the second fixture 30 in the axis O direction.

Since the rubber elastic body at the second portions 59 is thinner in thickness in the axis O direction than the rubber elastic body at the first portions 58, the spring at the second portions 59 can be made harder than the spring at the first portions 58. In the present embodiment, the first portions 58 are formed in the first direction (the arrow X direction in FIG. 1), and the second portions 59 are formed in the second direction (the arrow Y direction in FIG. 1).

The second fixture 30 attaches to the opening 32 a diaphragm 60 facing the large-diameter side end portion 52 (the concave portion 54) of the antivibration base body 50. The diaphragm 60 is a round-shape flexible membrane constituted by a rubber elastic body and has an annular metal fitting 61 jointed through vulcanization at its outer peripheral rim.

A closed space partitioned by the second fixture 30, the antivibration base body 50 and the diaphragm 60 encloses therein a liquid (an incompressible fluid such as water or the like) and defines a liquid chamber. The liquid chamber is divided by a partitioning member 62 into a pressure receiving chamber 64 and an equilibrium chamber 65, wherein the antivibration base body 50 defines a part of chamber walls of the pressure receiving chamber 64 while the diaphragm 60 defines a part of chamber walls of the equilibrium chamber 65. The partitioning member 62 is in close contact at its outer periphery with the sealing layer 52a to divide the liquid chamber into the pressure receiving chamber 64 and the equilibrium chamber 65. Between a groove 63 formed on its outer periphery and the sealing layer 52a, the partitioning member 62 forms an orifice 66 which makes the pressure receiving chamber 64 and the equilibrium chamber 65 communicate with each other.

The partitioning member 62 and the diaphragm 60 are inserted from the opening 32 into the second fixture 30 in order of the partitioning member 62 and the diaphragm 60. Thereafter, the second fixture 30 is subjected to a diameter reduction process, and the end portion 33 of the second fixture 30 is bent inside to be contacted closely with the metal fitting 61. Thus, the partitioning member 62 and the diaphragm 60 are secured inside the second fixture 30.

At the end portion 24 of the first fixture 20 with the antivibration base body 50 joined thereto, the area of the second projection plan made by projecting the end portion 24 in the second direction (the arrow Y direction in FIG. 1) is larger than the area of the first projection plane made by projecting the end portion 24 in the first direction (the arrow X direction in FIG. 1). Therefore, the spring in the first direction is made to be softer than the spring in the second direction. By making the first direction of the antivibration device 10 agree with the right-left of the vehicle and the second direction of the antivibration device 10 agree with the front-rear of the vehicle, a vibration isolation effect in the vehicle front-rear direction is performed to mitigate vibration caused by acceleration, deceleration and the like. On the other hand, a vibration damping effect is performed in the vehicle right-left direction to improve the ride quality.

Since the areas of the projection planes in the two directions of the end portion 24 of the first fixture 20 are made to differ to make the springs in the two directions differ, it is possible to be difficult to make influence to be exerted on the free lengths of the wall portion 53 in the first direction (the X direction) and the second direction (the Y direction). Since the free lengths of the wall portion 53 can be prevented from becoming short, the buckling of the wall portion 53 can be prevented even where a large displacement is inputted between the first fixture 20 and the second fixture 30. Further, since the external shape of the antivibration base body 50 is unnecessary to be altered, it is not required to alter a mold used for performing a vulcanization molding of the antivibration base body 50. Alternatively, the alteration of the mold can be restrained to a minimum. As a result, it is possible to make the effective use of an existing facility.

In the antivibration base body 50, a portion (a part of the wall portion 53) surrounding the outer peripheral surfaces 24b, 24c, 24e of the end portion 24 is larger in outer diameter than a portion (a part of the connection portion 55) surrounding the outer peripheral surfaces 24a, 24d of the end portion 24. Thus, when a load is inputted, a large distortion is produced at a boundary B (the surface and the inside) between the connection portion 55 and the wall portion 53. In order to make this distortion small, the first fixture 20 is formed with the base portion 23.

At the base portion 23, the area of the first projection plane made by projecting the base portion 23 in the first direction (the arrow X direction in FIG. 1) is substantially the same as the area of the second projection plane made by projecting the base portion 23 in the second direction (the arrow Y direction in FIG. 1). The connection portion 55 surrounding the base portion 23 is small in volume and thin in comparison with the wall portion 53, and thus, compared with the case that the base portion 23 does not exist, the connection portion 55 can be made to be hard by being given an influence of the base portion 23. Because of an increase in the hardness of the connection portion 55, the distortion produced at the boundary B between the connection portion 55 and the wall portion 53 can be restrained. As a result, it is possible to improve the durability of the antivibration base body 50.

Further, in the section including the axis O, the outer peripheral surfaces 24a, 24d of the end portion 24 connected to the base portion 23 of the first fixture 20 are inclined relative to the axis O. Thus, the thickness of the rubber elastic body surrounding the junction 21 in the circumferential direction is made to be increased gradually toward the wall portion 53 from the connection portion 55 in the axis O direction. Since the connection portion 55 can be more difficult to be influenced by the base portion 23 as the connection portion 55 comes closer to the wall portion 53, the connection portion 55 buffers the distortion produced at the boundary B between the connection portion 55 and the wall portion 53. As a result, the distortion produced at the boundary B between the connection portion 55 and the wall portion 53 is made to be small, and hence, it is possible to improve the durability of the antivibration base body 50.

The first fixture 20 is formed with the chamfer portion 22 where the corner connecting the flange portion 25 to the junction 21 is removed, and thus, of the connection portion 55, a portion covering the chamfer portion 22 can avoid having a load concentrated thereon. As a result, of the connection portion 55, a portion covering the chamfer portion 22 can be prevented from having a crack produced thereat.

The first fixture 20 is equipped with the stopper portion 56 including the rubber elastic body covering the flange portion 25. Since the restriction member 40 secured to the second fixture 30 faces the stopper portion 56 in the axis O direction to restrain the relative displacement to the first fixture 20, it is possible to limit the tensile load exerted on the antivibration base body 50 in the axis O direction. As a result, it is possible to improve the durability of the antivibration base body 50.

At the flange portion 25, the protrusions 27 protruding in the axis O direction are provided intermittently in the circumferential direction. The stopper portion 56 is equipped with the first portions 58 where the rubber elastic body covers the flat portions 26 between the protrusions 27, and the second portions 59 where the rubber elastic body covers the protrusions 27. The thickness in the axis O direction of the rubber elastic body at the second portions 59 is thinner than the thickness in the axis O direction of the rubber elastic body at the first portions 58, and thus, the spring at the first portions 58 can be made to be softer than the spring at the second portions 59. Therefore, it is possible to easily provide the stopper portion 56 where the hardness of the spring in the axis O direction differs. When the first portion 58 is brought into abutment on the restriction member 40 (the second restriction portion 43), it is possible to obtain a vibration isolation effect owing to the dynamic spring of the first portion 58.

In the present embodiment, the first portions 58 are disposed in the first direction (the arrow X direction in FIG. 1). Since in the antivibration base body 50, the spring constant in the first direction is smaller than that in the second direction, the antivibration base body 50 demonstrates the damping effect of the vibration inputted in the first direction. Further, when the first portion 58 of the stopper portion 56 abuts on the restriction member 40, the vibration isolation effect can be obtained owing to the first portion 58.

Incidentally, it is possible as a matter of course to dispose the first portions 58 in the second direction (the arrow Y direction in FIG. 1) by changing the positions of the protrusions 27 of the flange portion 25. Since in the antivibration base body 50, the spring constant in the second direction is larger than that in the first direction, the antivibration base body 50 demonstrates the isolation effect of the vibration inputted in the second direction. Further, when the first portion 58 of the stopper portion 56 abuts on the restriction member 40, the vibration isolation effect can be obtained owing to the first portion 58.

Further, it is possible as a matter of course to dispose the first portions 58 in the first direction (the arrow X direction in FIG. 1) and the second direction (the arrow Y direction in FIG. 1) by changing the flat portions 26 of the flange portion 25 to be disposed in the first direction and the second direction. In this case, even when vibration is inputted in any of the first direction and the second direction, the first portion 58 of the stopper portion 56 comes into abutment on the restriction member 40, so that the vibration isolation effect can be obtained owing to the dynamic spring at the first portions 58.

Figure 3:
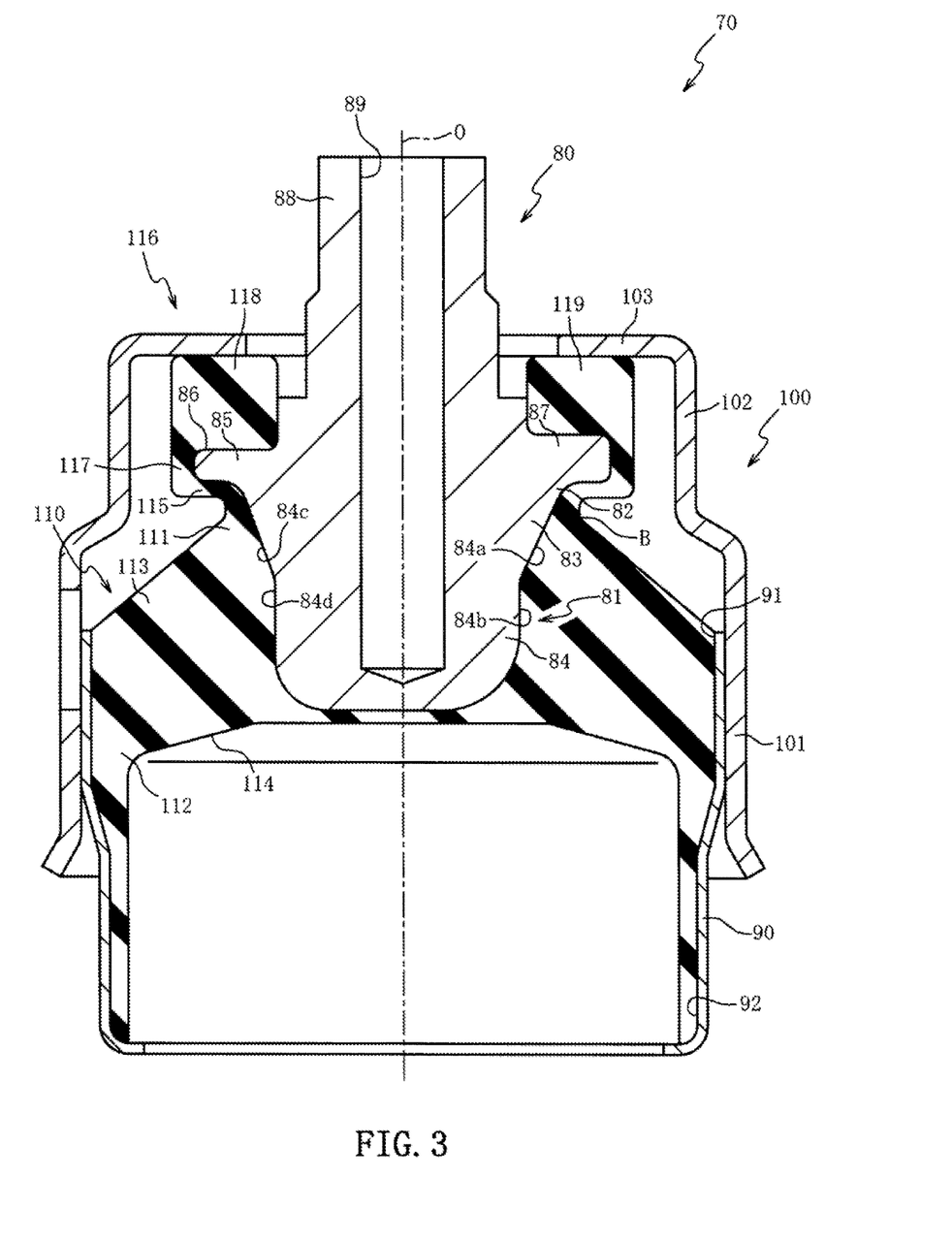
FIG. 3 is a sectional view of an antivibration device in a second embodiment.

Next, a second embodiment will be described with reference to FIG. 3. FIG. 3 is a sectional view of an antivibration device 70 in the second embodiment. The position where a section of the antivibration device 70 shown as a sectional view in FIG. 3 is taken is the same as the position where the section is made in FIG. 1 and FIG. 2. For convenience, FIG. 3 omits the diaphragm 60 and the partitioning member 62 from illustration. Incidentally, the antivibration device 70 shown in FIG. 3 is illustrated as being in a no-load state.

As shown in FIG. 3, the antivibration device 70 is equipped with a first fixture 80 attached to an engine (not shown) side being a vibration source, a second fixture 90 attached to a vehicle body (not shown) on a supporting side, and an antivibration base body 110 including a rubber elastic body and interposed between the first fixture 80 and the second fixture 90 to join the first fixture 80 and the second fixture 90.

The first fixture 80 is a shaft-like casting integrally made of an iron-base material, an aluminum alloy or the like and extending in the axis O. The first fixture 80 is equipped with a junction 81 with the antivibration base body 110 joined at its outer periphery, a flange portion 85 connected to the junction 81, and a shaft portion 88 connected to the flange portion 85. The shaft portion 88 is formed at its center with a bolt hole 89 extending along the axis O. The first fixture 80 is attached to a mating member like the engine or the like through a bolt (not shown) screwed in the bolt hole 89.

The junction 81 is equipped with a chamfer portion 82, a base portion 83 and an end portion 84. The chamfer portion 82 is a portion where a corner connecting the flange portion 85 with the junction 81 is removed to be made as a circular surface. The base portion 83 is a region connected to the chamfer portion 82 in the axis O direction. In the present embodiment, the base portion 83 takes a frustoconical shape. The base portion 83 is set so that a first projection plane made by projecting the base portion 83 in a first direction (the arrow X direction in FIG. 1) orthogonal to the axis O is the same in area as a second projection plane made by projecting the base portion 83 in a second direction (the arrow Y direction in FIG. 1) orthogonal to the axis O and the first direction. The base portion 83 is a region where, of the junction 81, right and left areas with the axis O therebetween in FIG. 3 become the same size.

The end portion 84 is a region connected to the base portion 83 in the axis O direction. The end portion 84 takes a flat shape wherein the second projection plane made by projecting the end portion 84 in the second direction (the arrow Y direction in FIG. 1) is larger in area than the first projection plane made by projecting the end portion 84 in the first direction (the arrow X direction in FIG. 1). The end portion 84 is a region which, of the junction 81, is a portion where in FIG. 3, the area on the left side of the axis O is larger than the area on the right side.

In the present embodiment, the end portion 84 has outer peripheral surfaces 84a, 84b appearing on the first projection plane and has outer peripheral surfaces 84c, 84d appearing on the second projection plane. The outer peripheral surfaces 84a, 84b are connected in the axis O direction in a direction going away from the flange portion 85, and so are the outer peripheral surfaces 84c, 84d. In the section including the axis O, the outer peripheral surfaces 84a, 84c are inclined to make the distance from the axis O become smaller gradually with distance from the flange portion 85. In the section including the axis O, the angle which the outer peripheral surface 84a makes with the axis O is larger than the angle which the outer peripheral surface 84c makes with the axis O. In the section including the axis O, the outer peripheral surfaces 84b, 84d are almost parallel to the axis O, and the distance between the outer peripheral surface 84b and the axis O is smaller than the distance between the outer peripheral surface 84d and the axis O. Thus, the end portion 84 takes a frustoconical shape being flat on a root side close to the flange portion 85 and takes a column shape being flat on the end side remote from the flange portion 85.

The flange portion 85 takes a shape of a disc whose outer diameter is larger than the outer diameter of the base portion 83. The flange portion 85 is formed with protrusions 87 protruding in the axis O direction at a surface opposite to the surface to which the chamfer portion 82 is connected. The protrusions 87 are provided intermittently in the circumferential direction of the flange portion 85, and flat portions 86 being lower than the height in the axis O direction of the protrusions 87 are formed between the protrusions 87. In the present embodiment, the flat portions 86 are formed in the first direction (the arrow X direction in FIG. 1), while the protrusions 87 are formed in the second direction (the arrow Y direction in FIG. 1).

The second fixture 90 is a sleeve-like member of a high rigidity having an inner diameter larger than the outer diameter of the junction 81 and is formed with openings 91, 92 at opposite ends in the axis O direction. The first fixture 80 is disposed to be spaced from the second fixture 90 on the same axis O as the second fixture 90 with the junction 81 directed toward the opening 91 side. The second fixture 90 has a restriction member 100 secured thereto.

The restriction member 100 is a high rigidity member for restraining the relative displacement between the first fixture 80 and the second fixture 90 through an abutment on a stopper portion 116 (referred to later). The restriction member 100 is equipped with a sleeve-like retainer portion 101 into which the second fixture 90 is inserted, a sleeve-like first restriction portion 102 extending from the retainer portion 101 in the axis O direction, and a second restriction portion 103 protruding radially inward from an end portion in the axis O direction of the first restriction portion 102.

The antivibration base body 110 is a member constituted by a rubber elastic body and is equipped with a small-diameter side end portion 111 on one end side in the axis O direction, a large-diameter side end portion 112 on the other end side, and a wall portion 113 connecting the small-diameter side end portion 111 and the large-diameter side end portion 112. The small-diameter side end portion 111 is a region to which the junction 81 of the first fixture 80 is joined through vulcanization at its outer periphery. Since the junction 81 is joined to the small-diameter side end portion 111, the junction 81 is embedded in the antivibration base body 110. The large-diameter side end portion 112 is a region whose outer diameter is formed to be larger than that of the small-diameter side end portion 111. The large-diameter side end portion 112 is joined through vulcanization at its outer peripheral surface to an inner peripheral surface on the opening 91 side of the second fixture 90.

Since the antivibration base body 110 is joined through vulcanization to the first fixture 80 and the second fixture 90, the wall portion 113 closing the opening 91 of the second fixture 90 is interposed between the first fixture 80 and the second fixture 90. The wall portion 113 takes a frustoconical shape. The antivibration base body 110 is formed with a concave portion 114 at an end surface in the axis O direction of the large-diameter side end portion 112. The concave portion 114 expands in inner diameter with distance from the first fixture 80 in the axis O direction.

The antivibration base body 110 has a connection portion 115 connected to the small-diameter side end portion 111. The connection portion 115 surrounds a portion which, of the first fixture 80, extends from the base portion 83 to the flange portion 85 through the chamfer portion 82. The connection portion 115 is a region that connects the small-diameter side end portion 111 and the stopper portion 116.

The stopper portion 116 is a rubber elastic body covering the flange portion 85. The stopper portion 116 restrains the relative displacement of the first fixture 80 to the second fixture 90 in abutment on the restriction member 100. The stopper portion 116 is equipped with a side portion 117 covering an outer peripheral surface of the flange portion 85, first portions 118 covering the flat portions 86 of the flange portion 85, and second portions 119 covering the protrusions 87 of the flange portion 85. The side portion 117 faces the first restriction portion 102 of the restriction member 100. When the side portion 117 abuts on the first restriction portion 102, the relative displacement is restrained between the first fixture 80 and the second fixture 90 in a direction orthogonal to the axis O. The first portions 118 and the second portions 119 face the second restriction portion 103 of the restriction member 100. When the first portions 118 and the second portions 119 abut on the second restriction member 103, the relative displacement is restrained between the first fixture 80 and the second fixture 90 in the axis O direction.

Since the rubber elastic body at the second portions 119 is thinner in thickness in the axis O direction than the rubber elastic body at the first portions 118, the spring at the second portions 119 can be made harder than the spring at the first portions 118. In the present embodiment, the first portions 118 are formed in the first direction (the arrow X direction in FIG. 1), and the second portions 119 are formed in the second direction (the arrow Y direction in FIG. 1).

In the antivibration device 70, at the end portion 84 of the first fixture 80 to which the antivibration base body 110 is joined, the second projection plane made by projecting the end portion 84 in the second direction (the arrow Y direction in FIG. 1) is larger in area than the first projection plane made by projecting the end portion 84 in the first direction (the arrow X direction in FIG. 1). Therefore, the spring in the first direction is made to be softer than the spring in the second direction.

In the antivibration base body 110, a portion (a part of the wall portion 113) surrounding the end portion 84 is larger in outer diameter than a portion (a part of the connection portion 115) surrounding the chamfer portion 82. Thus, when a load is inputted, a large distortion is produced at a boundary B (the surface and the inside) between the connection portion 115 and the wall portion 113. In order to make this distortion small, the first fixture 80 is formed with the base portion 83.

At the base portion 83, the first projection plane made by projecting the base portion 83 in the first direction (the arrow X direction in FIG. 1) is the same in area as the second projection plane made by projecting the base portion 83 in the second direction (the arrow Y direction in FIG. 1). The connection portion 115 surrounding the base portion 83 is small in volume and thin in comparison with the wall portion 113, and thus, compared with the case that the base portion 83 does not exist, the connection portion 115 can be made to be hard by being given an influence of the base portion 83. Because of an increase in the hardness of the connection portion 115, the distortion produced at the boundary B between the connection portion 115 and the wall portion 113 can be restrained. As a result, it is possible to improve the durability of the antivibration base body 110.

Further, in a section including the axis O, the first fixture 80 has the base portion 83 whose outer peripheral surfaces 84a, 84c are inclined relative to the axis O. Thus, the thickness of the rubber elastic body surrounding the junction 81 in the circumferential direction can be increased gradually with distance from the flange portion 85 in the axis O direction. Since the connection portion 115 can become harder to be influenced by the base portion 83 with distance from the flange portion 85, the connection portion 115 buffers the distortion produced at the boundary B between the connection portion 115 and the wall portion 113. As a result, the distortion produced at the boundary B between the connection portion 115 and the wall portion 113 can be made to be small, and hence, it is possible to improve the durability of the antivibration base body 110.

Furthermore, because the stopper portion 116 and the restriction member 100 can limit the displacement amount of the antivibration base body 110, a tensile load exerted on the antivibration base body 110 can be restrained similarly to the first embodiment. Therefore, it is possible to improve the durability of the antivibration base body 110.

Hereinabove, the present invention has been described based on the embodiments. However, the present invention is not in any way limited to the foregoing embodiments, and it can easily be inferred that various modifications for improvement are possible without departing from the gist of the present invention. For example, in order to meet properties required, it is possible to suitably set the shapes of the first fixture 20, 80, the second fixture 30, 90 and the antivibration base body 50, 110, the position of the first fixture 20, 80 relative to the second fixture 30, 90, and the like.

In the foregoing respective embodiments, description has been made regarding the example of the liquid sealed antivibration device 10, 70 wherein a liquid is enclosed between the antivibration base body 50, 110 and the diaphragm 60. However, the present invention is not necessarily limited to this example. It is possible as a matter of course to omit the diaphragm 60, the partitioning member 62 and the like and to make an application to an antivibration device of a non-liquid sealed type which only utilizes the antivibration base body 50, 110 (the property of the rubber elastic body). This is because even in the antivibration device of the non-liquid sealed type, it is possible to make the spring constants in two directions orthogonal to the axis O differ in dependence on the shape of the first fixture 20, 80.

In the foregoing respective embodiments, description has been made regarding the example wherein the openings 31, 32, 91, 92 are formed on the opposite ends of the second fixture 30, 90. However, the present invention is not necessarily limited to this example. For example, in the case of the antivibration device of the non-liquid sealed type wherein the diaphragm 60, the partitioning member 62 and the like are omitted, it is possible to configure the second fixture 30, 90 as one which takes the form of a bottomed sleeve with one of the openings 32, 92 omitted.

In the foregoing respective embodiments, description has been made regarding the example wherein the chamfer portion 22, 82 of the first fixture 20, 80 is rounded. However, the present invention is not necessarily limited to this example. It is possible as a matter of course to provide the chamfer portion 22, 82 with a chamfering which forms a slant on the corner. Even where the chamfering is provided at the chamfer portion 22, 82, it is possible to prevent a load from being concentrated on a portion which, of the connection portion 55, 115, covers the chamfer portion 22, 82.

In the foregoing respective embodiments, description has been made regarding the antivibration device 10, 70 equipped with the second fixture 30, 90 and the antivibration base body 50, 110 which are formed to be nearly circular as viewed in the axial direction. However, the present invention is not necessarily limited to this example. For example, it is possible as a matter of course to form the shapes (external shapes) of the second fixture 30, 90 and the antivibration base body 50, 110 into an elongated circular shape or an elliptical shape as viewed in the axial direction. This makes it possible to effectively use an installation space for the antivibration device and hence, to improve the mountability on a motor vehicle or the like. Incidentally, the elongated circular shape means an oval shape or a racetrack shape, that is, a shape which is formed by two half circles mutually identical in dimension and two straight lines connecting these smoothly.

In the foregoing respective embodiments, description has been made regarding the example wherein the first direction in which the area of the projection plane of the junction 21, 81 (the first fixture 20, 80) is small is disposed in the vehicle right-left direction while the second direction in which the area of the projection plane of the junction 21, 81 is large is disposed in the vehicle front-rear direction. However, the present invention is not necessarily limited to this example. In order to meet a performance required, it is possible as a matter of course to dispose in the vehicle front-rear direction the first direction in which the projection plane of the junction 21, 81 is small in area, and to dispose in the vehicle right-left direction the second direction in which the projection plane of the junction 21, 81 is large in area. By disposing the antivibration device 10, 70 like this, it is possible to make the spring constant in the vehicle front-rear direction smaller than the spring constant in the vehicle right-left direction.

In the foregoing respective embodiments, description has been made regarding the example wherein the engine constituting a vibration source is attached to the first fixture 20, 80 while the vehicle body on the supporting side is attached to the second fixture 30, 90. However, the present invention is not necessarily limited to this example. It is possible as a matter of course to attach the first fixture 20, 80 to the supporting side (vehicle body) by the use of a suitable bracket (not shown) and to attach the second fixture 30, 90 to the vibration source (engine).

In the foregoing respective embodiments, description has been made regarding the example wherein the antivibration device 10, 70 is used as an engine mount for elastically supporting an automotive engine. However, the present invention is not necessarily limited to this example. It is possible as a matter of course to apply the present invention to antivibration devices used in a railway train, a motorcycle, a bicycle and the like without being limited to an antivibration device for a motor vehicle. Further, it is possible as a matter of course to make application to various antivibration devices not only for engine mount but also for body mount, differential gear mount and the like.

The invention claimed is:
1. An antivibration device comprising:
   a shaft-shape first fixture extending along an axis;
   a sleeve-shape second fixture having on at least one side an opening larger than an external shape of the first fixture; and
   an antivibration base body comprising a rubber elastic body and joined at least to the first fixture and the opening of the second fixture;
   wherein the first fixture is equipped with a junction having the antivibration base body joined to an outer periphery; and
   a flange portion connected to the junction and having the antivibration base body joined;
   wherein the junction is equipped with a chamfer portion where a corner connecting the flange portion and the junction is removed;
   a base portion connected to the chamfer portion in the axial direction; and
   an end portion connected to the base portion in the axial direction; and
   wherein at the junction, a first projection plane made by projecting at least the end portion in a first direction orthogonal to the axis is set to be smaller in area than a second projection plane made by projecting at least the end portion in a second direction orthogonal to the axis and the first direction;
   wherein at the base portion, the area of the first projection plane and the area of the second projection plane are substantially the same in size wherein an outer diameter of the end portion in the first projection plane is less than an outer diameter of the end portion in the second projection plane.
2. An antivibration device comprising:
   a shaft-shape first fixture extending along an axis;

a sleeve-shape second fixture having on at least one side an opening larger than an external shape of the first fixture; and an antivibration base body comprising a rubber elastic body and joined at least to the first fixture and the opening of the second fixture;

wherein the first fixture is equipped with a junction having the antivibration base body joined to an outer periphery; and a flange portion connected to the junction and having the antivibration base body joined;

wherein the junction is equipped with a chamfer portion where a corner connecting the flange portion and the junction is removed;

a base portion connected to the chamfer portion in the axial direction; and an end portion connected to the base portion in the axial direction; and wherein at the junction, a first projection plane made by projecting at least the end portion in a first direction orthogonal to the axis is set to be smaller in area than a second projection plane made by projecting at least the end portion in a second direction orthogonal to the axis and the first direction; and wherein the first fixture is equipped with a stopper portion comprising a rubber elastic body and covering a surface of the flange portion opposite to the junction; the device further comprising:

a restriction member secured to the second fixture and facing the stopper portion in the axial direction for restraining the relative displacement of the first fixture; and the flange portion is equipped with protrusions provided on the surface intermittently in a circumferential direction and protruding in the axial direction and flat portions between the protrusions;

the stopper portion is equipped with first portions covering the flat portions with the rubber elastic body and second portions covering the protrusions with the rubber elastic body; and the thickness in the axial direction of the rubber elastic body at the second portions is thinner than the thickness in the axial direction of the rubber elastic body at the first portions.

3. The antivibration device according to claim 2, wherein the first portions are disposed in the first direction or the second direction.

4. The antivibration device according to claim 1, wherein the antivibration base body is equipped with a connection portion surrounding a portion which, of the first fixture, extends from the base portion through the chamfer portion to the flange portion; and a wall portion connected to the connection portion and closing the opening of the second fixture; and wherein in a section including the axis, an outer peripheral surface of the junction is inclined, at a radially inside position of a boundary between the wall portion and the connection portion, relative to the axis such as to come closer to the axis in relation to distance from the flange portion.

\* \* \* \* \*